Figure 1:
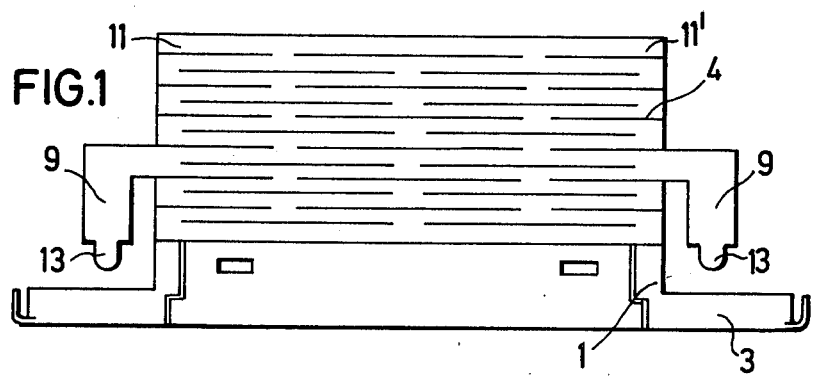

United States Patent [19]

Boller et al.

[11] 4,038,520

[45] July 26, 1977

[54] ELEMENT GUARDS FOR ELECTRIC TOASTERS

[75] Inventors: Gerd Boller, Karben; Karl Knott, Neu-Isenburg; Heinz Marburger, Frankfurt am Main; Norbert Voss, Offenbach (Main); Manfred Wolf, Altheim, all of Germany

[73] Assignee: Rowenta-Werke GmbH, Germany

[21] Appl. No.: 583,061

[22] Filed: June 2, 1975

[30] Foreign Application Priority Data

June 6, 1974 Germany .............................. 2427247
May 7, 1975 Germany .............................. 2520354

[51] Int. Cl.² .............................................. H05B 3/06
[52] U.S. Cl. ....................................... 219/521; 99/389

[58] Field of Search ................. 219/521; 248/27, 309, 248/361; 428/547; 99/385, 389, 391, 393, 394, 334; 29/190

[56] References Cited

U.S. PATENT DOCUMENTS 3,228,319 1/1966 Miller ................................... 99/389
3,793,936 2/1974 Wills .................................. 99/385 X

*Primary Examiner*—C. L. Albritton
*Attorney, Agent, or Firm*—George R. Clark; Neil M. Rose; John S. Pacocha

[57] ABSTRACT

An element guard for an electric toaster is formed from a sheet metal blank and has at least one grid formed by extending a slotted area of the blank. The guard defines a toasting chamber within the toaster and the grid has openings therein so that heat radiated by a heating element of the toaster can toast bread in the toasting chamber.

14 Claims, 10 Drawing Figures

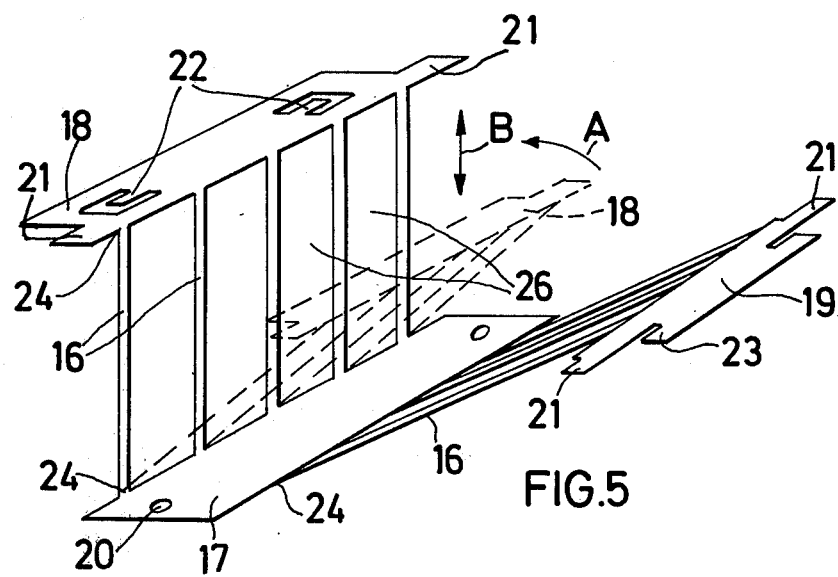
FIG.5
FIG.6
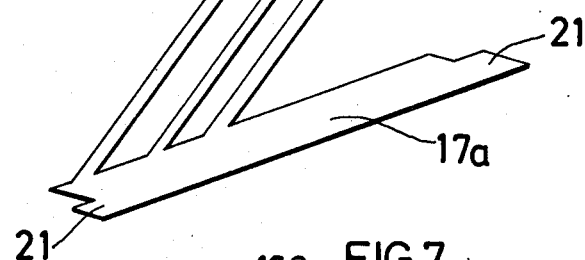
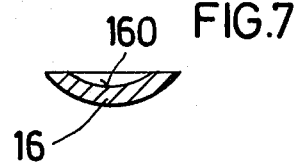
FIG.7

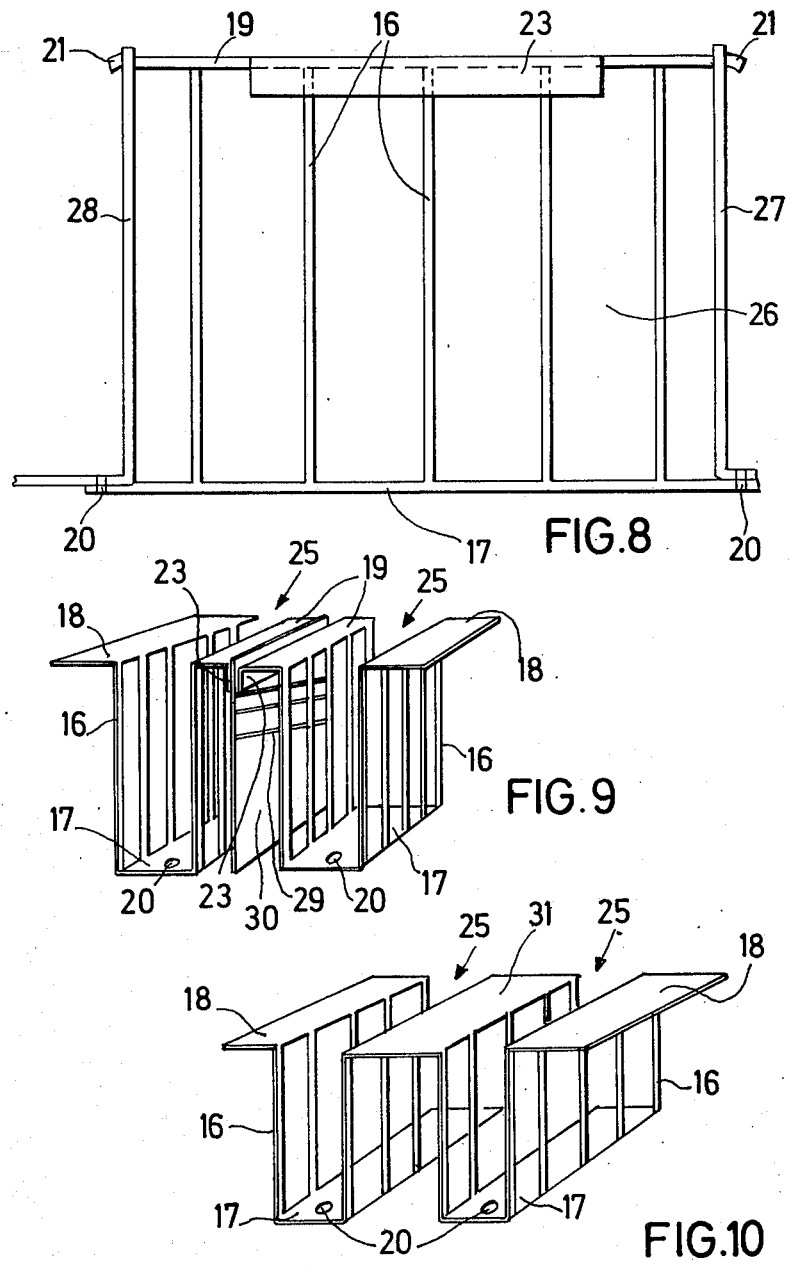

ELEMENT GUARDS FOR ELECTRIC TOASTERS

The present invention relates to element guards for electric toasters, and to blanks from which such element guards are made.

It is necessary to prevent bread to be toasted in an electric toaster from coming into direct contact with the heating elements. Element guards are therefore used to prevent such contact. Hitherto known guards have been made either from individual components, in which case time has had to be spent in assembling the guards, or else they have been stamped or cut out of a single piece of material, in which case there is a considerable wastage of material.

It is an object of the present invention to provide an element guard for an electric toaster which reduces the disadvantages referred to above.

According to a first aspect of the present invention there is provided an element guard for an electric toaster, said guard having been formed from a sheet metal blank and including a grid, said grid having been formed by expansion of a slotted area of said blank of substantially smaller area than the area of said grid.

In one embodiment the grid has a plurality of openings which are rhombic or rectangular in cross-section formed by stretching the slotted area of the blank, said slotted area having a plurality of parallel slots aligned in parallel rows and having been stretched in a direction substantially at right angles to the direction of said rows.

In another embodiment the grid has a plurality of struts defining openings therebetween, said struts extending between first and second planar portions, said first portion overlying said second portion and being spaced therefrom.

According to a further aspect of the present invention there is provided a blank of sheet metal adapted to be formed into an element guard for an electric toaster, an area of said blank being slotted and the arrangement of slots being such as to enable the slotted area of the blank to be expanded in the formation of the blank into said element guard to form a grid of area substantially greater than that of said slotted area.

An element guard of the invention is simple in structure and can be rapidly produced and assembled. Preferably blanks can be formed from a metal sheet in a continuous process and passed to an assembly point where they are deformed to form guards and inserted in toasters.

The element guards of the invention have one or more protective grids formed from slotted areas of the blank. The grids have a plurality of openings therein which may be defined by a lattice, or by a plurality of spaced struts. The openings of the grid, which allow radiant heat from the heating elements to reach the toasting chambers, may be of any shape required.

Figure 2:
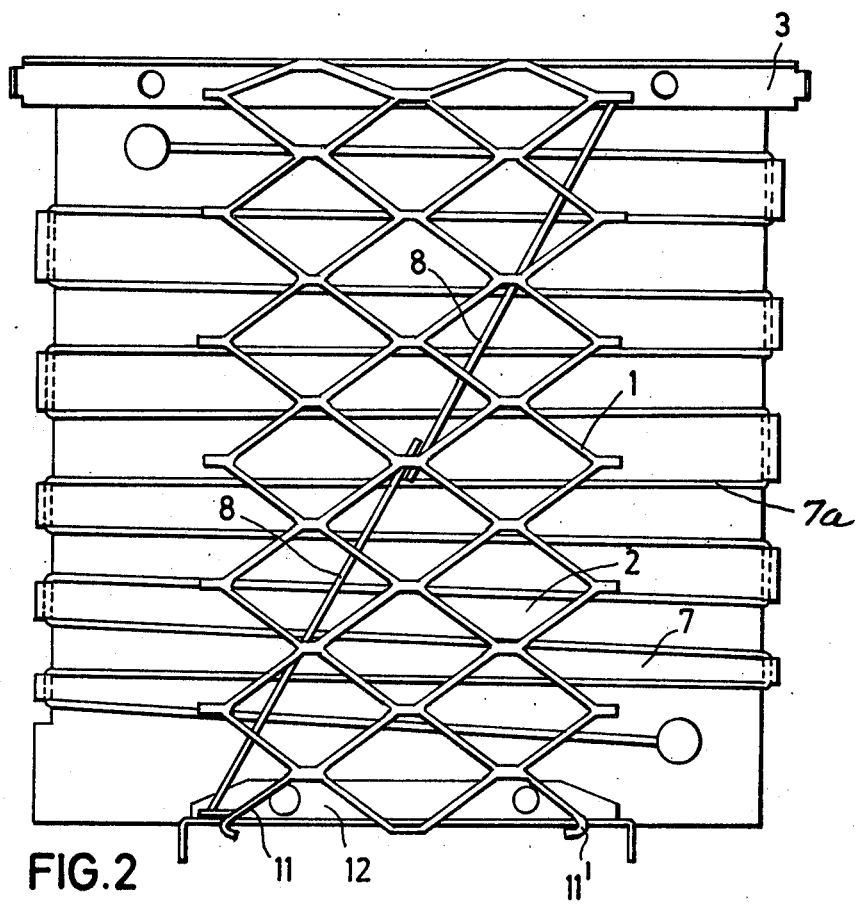
Figure 3:
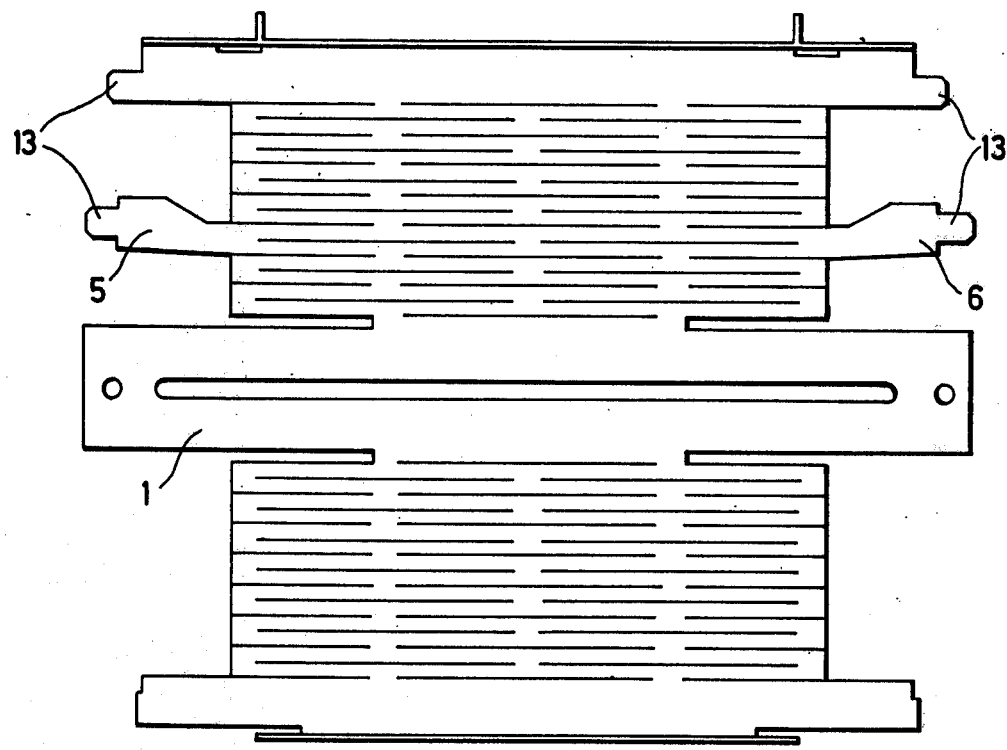
Figure 4:
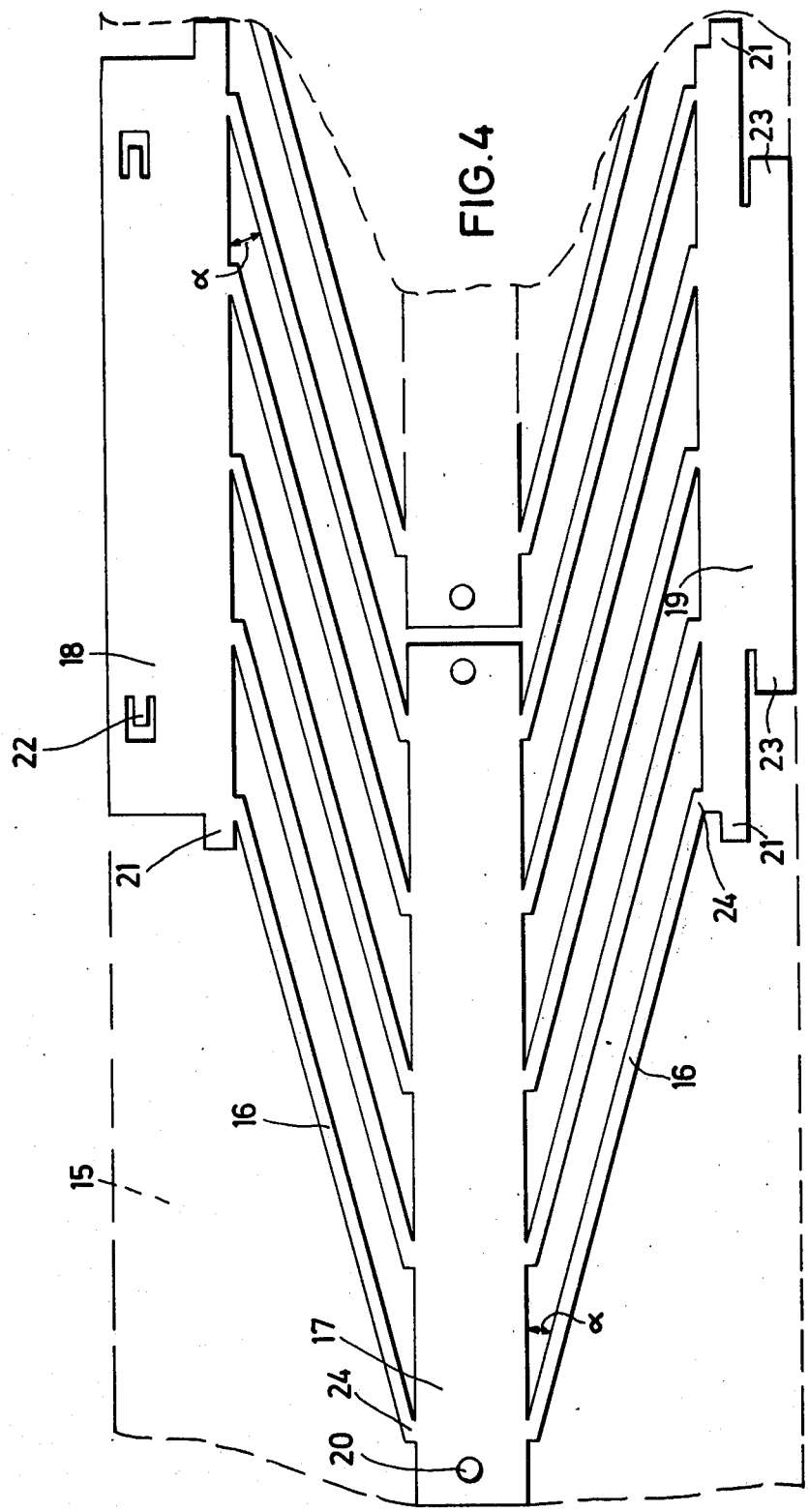

Embodiments of the present invention will hereinafter be described, by way of example, with reference to the accompanying drawings, in which:

FIG. 1 shows a blank for making an element guard of a first embodiment of the invention, FIG. 2 shows an element guard made from the blank of FIG. 1, FIG. 3 shows a blank for making a second embodiment of an element guard, FIG. 4 shows a blank for making a third embodiment of an element guard, FIG. 5 shows schematically the formation of a guard from the blank of FIG. 4, FIG. 6 shows schematically the formation of a further embodiment of a guard from a blank, FIG. 7 shows a section of a strut of the blank of FIG. 4, FIG. 8 shows the mounting of an element guard in a toasting chamber of an electric toaster.

FIG. 9 shows an embodiment of an element guard for two toasting chambers of an electric toaster, and FIG. 10 shows a further embodiment of an element guard for two toasting chambers.

FIG. 1 shows a sheet metal blank 1 from which an element guard for an electric toaster can be made. The blank 1 is planar and substantially rectangular and has a plurality of slots 4 formed therein. A support rail 3 is formed on one edge of the blank 1 and metal strips 11,11' are formed on the opposite edge of the blank 1. Spacer supports 9 provided with foldable tabs 13 are formed on opposite sides of the blank 1 and extend parallel to the plane of the blank.

FIG. 2 shows the blank 1 when it has been formed into an element guard and secured to a heating element support 7 of the electric toaster. The toaster heating element includes the heating element support 7 and a resistance wire element 7a supported thereon in a conventional manner as is best shown in FIG. 2. The support rail 3 of the blank 1 is secured to the heating element support 7, and then the blank 1, which is shorter in length than the support 7, is stretched across the support 7 so that the strips 11,11' can be connected to a cover plate 12 mounted on the support 7 by folding. As the blank 1 is stretched the slotted area thereof forms a protective grid having a plurality of substantially rhombic shaped opening 4 formed from the slots 4. The spacer supports 9 are bent so that they extend at right angles to the surface of the protective grid formed from the slotted area of the blank 1. The tabs 13 may then be passed through apertures provided (not shown) in the support 7 and bent to secure the element guard to the support 7. The spacer supports 9 ensure that the protective grid of the element guard is spaced from the support 7 and hence from the heating element carried by the support 7.

The element guard and the heating element support 7 shown in FIG. 2 form a single unit which can easily be inserted into an electric toaster, the cover plate 12 and strips 11,11' being secured to the base of the toasting chamber. It will be understood that the protective grid is held under tension across the surface of the support 7 so that any thermal expansion is counteracted and the grid is kept rigid whether the electric heating elements of the toaster are on or off. In the embodiment shown in FIG. 2, two metal reinforcements 8 extend diagonally between the support 7 and the element guard, the free ends of these reinforcements being connected together to give even greater rigidity to the protective grid.

FIG. 3 shows a sheet metal blank 1 which may be stretched to form an element guard having two protective grids, one for each side of a toasting chamber. It is also possible to provide a metal blank which may be formed into an element guard having protective grids for more than one toasting chamber. In this instance the blank is formed with a number of slotted extensible areas, the number of slotted areas corresponding to the number of protective grids to be formed. FIG. 3 indicates how an element guard having two protective grids can be formed from a single blank 1. The blank 1 of FIG. 3 is similar to that of FIG. 1 but has two slotted extensible areas separated by a substantially central portion. Support strips 5 and 6 provided with foldable tabs 13 are formed on the blank 1 and extend perpendicular to the direction in which the blank is to be stretched and project laterally of the blank 1. The blank 1 is bent so that the two slotted, extensible areas extend substantially parallel to each other and perpendicular to the central portion. The two slotted areas are then stretched to form two protective grids. The element guard so formed can then be mounted in a toasting chamber and supported therein by means of the support strips 5 and 6 the tabs 13 of which are passed through slots in the side walls of the toasting chamber and turned over. The support strips 5 and 6 and the tabs 13 thus effect a particularly firm bracing of the grids resulting in a high degree of rigidity. A more detailed description of this embodiment is not given herein as anyone skilled in the art will be able to discern how the element guard is constructed from the blank and secured in position within the toasting chamber.

FIG. 4 shows a further embodiment of a sheet metal blank for forming an element guard having two protective grids, the blank having been stamped or cut out from a metal sheet 15. The blank has a substantially central planar portion 17 and two lateral planar portions 18 and 19. Each lateral portion 18, 19 is connected to the central portion 17 by a plurality of parallel extending struts 16. The struts 16 make an acute angle α with both the lateral portion 18, 19 and the central portion 17. In the embodiment illustrated each lateral portion 18, 19 is connected to the central portion 17 by five struts 16. The number of struts 16 and their width determine the magnitude of the angle α. It has been found that angle α should preferably be between 10° and 15°, this giving the lowest wastage of material and optimum width of struts. The magnitude of angle α is also effected by the spacing between the struts. As can be seen from FIG. 4 a plurality of blanks can be formed from a single sheet of metal 15 with only a small space between successive blanks. Screw holes 20 are formed in the central portion 17 so that this portion may be fastened by screws into the toasting chamber of an electric toaster. Additionally, fixing tabs 22 are formed in the lateral portion 18 and foldable tabs 21 are provided on each of the lateral portions 18 and 19. The function of the tabs 21 will be described in more detail hereinbelow. A clamping edge 23 is also formed on the lateral portion 19.

The blank shown in FIG. 4 can be deformed to provide an element guard having two protective grids as is indicated in FIG. 5. Originally, as the blank is formed from a metal sheet, the two lateral portions 18 and 19 and the central portion 17 are coplanar. Each lateral portion 18, 19 is then moved out of this plane as indicated by arrow A in FIG. 5. The two lateral portions 18, 19 are moved until the struts 16, which pivot about points 24 during the movement of the lateral portions 18, 19 extend substantially perpendicular to the lateral portions 18, 19 and to the central portion 17. The element guard so formed can then be inserted into a toasting chamber. The central portion 17 forms the lowest portion of the guard and is fastened by screws to the base of the toasting chamber. The fixing tabs 22 of portion 18 are also used to fix the guard in position within the toasting chamber and the clamping edge 23 on portion 19 is clamped to a heating element support in the toasting chamber. It will be seen that when the guard assembled from the blank of FIG. 4 is fastened in position in a toasting chamber as described the struts 16 extend substantially vertically, that is, in the direction, indicated by arrow B (FIG. 5) in which slices of bread are inserted into and removed from the toasting chamber. The struts 16 form protective grids for the heating elements (not shown) of the toasting chamber and define rectangular radiant heat openings 26.

FIG. 6 illustrates a further embodiment of the invention in which an element guard is formed from a blank similar to that of FIG. 4. However, in this embodiment, the struts 16a of the blank are so arranged that when the blank is deformed so that the portion 18a overlies the portion 17a substantially parallel thereto the struts 16a extend at an acute angle to the portions 17a and 18a and do not extend parallel to the direction of insertion and removal of bread into the toasting chamber as in the previous embodiment. Tabs 21 are provided at the ends of both portions 17a and 18a.

FIG. 7 shows a cross-section of a strut 16. The struts 16a of FIG. 6 could also have the same cross-section. As can be seen from FIG. 7 the strut 16 is provided with a contour 160 which in the embodiment illustrated is arcuate. This contour 160 acts to increase the rigidity of the strut 16 so that there is no need to provide reinforcements for the protective grids. Other shapes for the contour 160 may be used.

FIG. 8 illustrates schematically an element guard having protective grids positioned within a toasting chamber. The element guard is made from a blank of the kind shown in FIG. 4 and has two spaced, parallel protective grids made up of vertically extending struts 16 which define the extent of the toasting chamber in one direction. The extent of the toasting chamber 25 in the other, perpendicular direction, is defined by two side walls 27 and 28. The element guard is secured to the side walls 27 and 28 by way of the tabs 21 which are passed through openings in the side walls 27 and 28 and then bent. Tabs 21 are shown on the portions 18 and 19 of FIG. 4. Similar tabs 21 may, of course, also be provided on the central portion 17. It will be seen from FIG. 8 that the element guard together with side walls 27 and 28 form a box which is of such strength as to be capable of being built into toasters without a conventional supporting frame.

FIG. 9 shows an element guard for a toaster having two toasting chambers 25 which are arranged side by side and extend substantially parallel with respect to one another. The guard of FIG. 9 is made from two blanks of the type shown in FIG. 4, the two lateral portions 19 being arranged adjacent to each other. The clamping edges 23 on each portion 19 are bent at right angles to the portion 19 and clamp the upper edge of a heating element support 30 which carries a heating element 29. The guard of FIG. 9 can be connected between two side walls, for example by way of tabs 21, as was described in connection with FIG. 8. Alternatively, the guard can be secured between two side walls in any other desired manner.

FIG. 10 illustrates an embodiment in which an element guard for two adjacent toasting chambers is made from a single blank. The single blank will have a form substantially corresponding to two of the blanks of FIG. 4 formed side by side. However, the two lateral portions 19 are omitted and replaced by a single portion 31. A simplified representation of the guard so formed is illustrated in FIG. 10. Fixing tabs 21 for connecting the guard to side walls may be formed on the element guard.

I claim:

1. In an electric toaster, the combination comprising a toaster heating element, an element guard, said guard including a grid and being formed from a sheet metal blank, the blank having a slotted area which is expanded to form the grid, the area of the slotted area of the blank being substantially smaller than the area of said grid, said guard being positioned with said grid in parallel spaced relation to said element.

2. In an electric toaster, the combination comprising a toaster heating element, an element guard, said guard including a grid having a plurality of openings which are rhombic or rectangular in shape, said guard being formed from a sheet metal blank having a slotted area including a plurality of parallel slots aligned in parallel rows, said grid being formed by expanding said slotted area of the blank in a direction substantially at right angles to the direction of said parallel rows of slots, said guard being positioned with said grid in parallel spaced relation to said element.

3. The combination as claimed in claim 2 having a substantially rectangular shape and including a support rail extending along one edge thereof parallel to the direction of said rows of slots.

4. The combination as claimed in claim 3 including two foldable strips formed on the edge of the guard opposite to said one edge.

5. The combination as claimed in claim 4, wherein said grid is substantially planar and extends between said support rail and said foldable strips, further including two spacer supports formed on opposite edges of said grid, said spacer supports extending substantially at right angles to the plane of said grid, and a foldable tab formed on the free end of each spacer support.

6. The combination as claimed in claim 5, wherein reinforcements extend diagonally across said grid between the support rail and said foldable strips.

7. In an electric toaster, the combination comprising a toaster heating element, an element guard made from a sheet metal blank having a slotted area, said guard including first and second spaced planar portions and a grid including a plurality of spaced struts defining openings therebetween, said grid being formed by expanding said slotted area of the blank, said guard being positioned with said grid in parallel spaced relation to said element.

8. The combination of claim 7 wherein said first and second planar portions extend parallel with respect to each other and said struts extend in a plane substantially perpendicular to said planar portions.

9. The combination of claim 8, wherein said struts extend parallel with respect to each other and perpendicularly with respect to said planar portions, and wherein said struts define substantially rectangular openings therebetween.

10. The combination of claim 8, wherein said struts extend parallel with respect to each other and at an acute angle with respect to said planar portions, and wherein said struts define openings in the shape of parallelograms therebetween.

11. In an electric toaster, the combination comprising a toaster heating element, an element guard formed from a blank of sheet metal, an area of said blank being slotted and the arrangement of slots in said slotted area being such as to enable said slotted area to be expanded in the formation of the blank into said element guard to form a grid of area substantially greater than that of said slotted area, said guard being positioned with said grid in parallel spaced relation to said element.

12. A blank as claimed in claim 11, wherein said slotted area has a plurality of parallel slots arranged in parallel rows.

13. A blank as claimed in claim 11, including first and second unslotted spaced coplanar portions, said slotted area extending between said first and second portions and including a plurality of spaced struts defining slots therebetween.

14. In an electric toaster including a toasting chamber, an electric heating element mounted to direct heat into a toasting chamber, and an element guard defining the extent of the toasting chamber interposed between the heating element and the toasting chamber, the element guard having been formed from a sheet metal blank having a slotted area, said guard including a grid formed by expansion of the area of said slotted area of the blank, the area of the slotted area of the blank being substantially smaller than the area of said grid.

* * * * *